US011688575B2

(12) United States Patent
Delbaere et al.

(10) Patent No.: US 11,688,575 B2
(45) Date of Patent: Jun. 27, 2023

(54) ELECTRICAL DEVICE FOR SUPPLYING POWER TO POWER ELECTRICAL UNITS

(71) Applicant: Schneider Electric Industries SAS, Rueil-Malmaison (FR)

(72) Inventors: Stephane Delbaere, Meylan (FR); Christian Jarrige, Saint Aupre (FR); Yves Belin, Herbeys (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 158 days.

(21) Appl. No.: 17/208,007

(22) Filed: Mar. 22, 2021

(65) Prior Publication Data

US 2021/0305727 A1 Sep. 30, 2021

(30) Foreign Application Priority Data

Mar. 24, 2020 (FR) ....................................... 2002858

(51) Int. Cl.
*H01H 71/02* (2006.01)
*H01H 89/06* (2006.01)
*H02B 1/04* (2006.01)

(52) U.S. Cl.
CPC ........ *H01H 71/0228* (2013.01); *H01H 89/06* (2013.01); *H02B 1/04* (2013.01)

(58) Field of Classification Search
CPC ....... H01H 71/0228; H01H 89/06; H02B 1/04
USPC ........................................................ 361/115
See application file for complete search history.

(56) References Cited

U.S. PATENT DOCUMENTS

2008/0278889 A1* 11/2008 Briggs ................... G06F 1/189
361/608
2019/0035589 A1* 1/2019 Delbaere .............. H01R 9/2658

FOREIGN PATENT DOCUMENTS

FR 2761539 A1 10/1998
FR 2805094 A1 8/2001
FR 3069716 A1 2/2019

OTHER PUBLICATIONS

French Search Report and Written Opinion dated Nov. 17, 2020 for French Patent Application No. FR 2002858, 8 pages.

* cited by examiner

*Primary Examiner* — Yemane Mehari
(74) *Attorney, Agent, or Firm* — Locke Lord LLP (57) ABSTRACT

An electrical device includes a fixed support with supply lines and a distribution circuit to supply power to a contactor block. Each contactor block includes secondary lines, each connected to a supply line, and is movable between joined and disjoined positions. Each contactor block includes a switching device for switching all secondary lines of the contactor block between open and closed. The electrical device also includes a control block, movable between joined and disjoined positions. When in the joined position, each contactor block also is held in the joined position, an electronic monitoring device of the control block also being connected to the switching device of each contactor block to control switching of each switching device independently. When the control block is in the disjoined position, the switching device of each contactor block opens the secondary lines, while each contactor block is movable between its joined and disjoined positions.

10 Claims, 6 Drawing Sheets

ELECTRICAL DEVICE FOR SUPPLYING POWER TO POWER ELECTRICAL UNITS

TECHNICAL FIELD

The present invention relates to an electrical device for supplying power to power electrical units.

BACKGROUND

In the field of supplying power to power electrical units such as electric motors, it is known practice to use electrical devices that allow electrical power to be supplied in a controlled manner to one or more power units. For example, a plurality of electric motors are connected to one such electrical device, to form what is called a "motor starter" assembly. This device is configured to receive an electric supply current, which is generally multiphase, and to redistribute it to a plurality of supply lines, each of which is connected to one or more electric motors. This device makes it possible to control each of these motors, for example by allowing selective switching of the current that flows through the supply lines.

FR-3 069 716-A1 describes an example of such an electrical device, which has a modular structure in which the supply lines are each connected to a removable connector, which may be replaced during maintenance operations. Each removable connector comprises a switching device, which prevents or allows the flow of the electric current through the supply lines. However, the switching device experiences wear in each circuit closing/opening cycle. When the switching device is faulty, the entire removable connector has to be replaced, involving the complete disconnection of the supply line, which is not very practical, in particular when the motor connected to the electrical device is a three-phase motor, which requires that the connections to the power supply phases be closely observed.

SUMMARY

The invention aims to overcome these drawbacks in particular, by providing an electrical device for supplying power to a plurality of power electrical units which is practical to use, in particular when replacing defective parts.

To that end, the invention relates to an electrical device for supplying power to a plurality of power units, which comprises a fixed support and a plurality of contactor blocks. The fixed support comprises input terminals, for receiving a polyphase power current, and a distribution circuit that is configured to distribute the power current to power lines that each comprise a plurality of single-phase supply lines, the fixed support comprising a number of power lines that is the same as the number of contactor blocks of the electrical device, and each power line comprising a number of supply lines that is the same as the number of phases of the power current, each of the supply lines of a contactor block being connected to a respective phase of the power current, the supply lines being accessible on the outside of the fixed support via intermediate terminals. Each contactor block comprises secondary lines, each secondary line being connected to a respective supply line via a respective intermediate terminal, the contactor blocks being movable between a joined position, in which each secondary line is electrically connected to a specific primary line via an intermediate terminal and is accessible on the outside of the contactor block via an output terminal block, and a disjoined position, in which each secondary line is not connected to a primary line. Each contactor block further comprises a switching device, which is switchable between an open position, in which all of the secondary lines of this contactor block are open, and a closed position, in which all of the secondary lines of this contactor block are closed and do not prevent the current from flowing between the intermediate terminals and the output terminal block. According to the invention, the electrical device also comprises a control block, which is movable between a joined position, in which the control block cooperates mechanically and electrically with the rest of the electrical device, and a disjoined position, in which the control block does not cooperate, either mechanically or electrically, with the rest of the electrical device. When the control block is in the joined position, each contactor block is, on the one hand, held in the joined position, an electronic monitoring device of the control block also being connected to the switching device of each of the contactor blocks, the electronic monitoring device being configured to control the switching of each switching device independently of the other switching devices. When the control block is in the disjoined position, the switching device of each of the contactor blocks is in the open state, while each of the contactor blocks is movable between its joined position and its disjoined position, independently of the other contactor blocks. The electrical connection between the secondary lines and the power units is provided by connectors, each connector being able to be disconnected from the one or more corresponding output terminal blocks when the one or more corresponding contactor blocks are in the disjoined position.

By virtue of the invention, the control block of the electrical device has to be disjoined from the rest of the electrical device before being able to disjoin a contactor block and the associated connector. Thus, it is possible to be certain that the contactor block is without power, and it may be replaced in complete safety. Furthermore, during this operation, the supply lines of the power units remain connected to the connector, which makes it possible, once the defective contactor block has been replaced, to reconnect the connector to the replaced contactor block, without having to worry about a potential phase reversal. Memory of wiring is thus retained.

According to some advantageous but non-mandatory aspects of the invention, such an electrical device may incorporate one or more of the following features, either alone or in any technically permissible combination:

- each contactor block comprises a locking member, which is movable by an operator between a locked position, in which this contactor block is held in the joined position, and an unlocked position, in which this contactor block is movable between its joined position and its disjoined position, while when the control block is in the joined position, the locking member of each contactor block in the joined position is held in the locked position, and when the control block is in the disjoined position, the locking member of each contactor block is accessible to an operator and is movable between the locked position and the unlocked position;
- the locking member comprises a stem with a first end and an opposite, second end, the stem being movable in translation with respect to the corresponding contactor block, while the first end of the locking member in the locked position extends beyond a lower face of the corresponding contactor block, and in the joined position of the contactor block, the first end of the locking member in the locked position cooperates with a complementary recess made in the fixed support so as to prevent the contactor block from moving, while the second end is blocked in translation by the control block in the joined position;

the support comprises a plate and an upright orthogonal to the plate along an edge defining a transverse direction of the support, while a groove opening out onto a front face of the upright is made in the upright in a direction parallel to and at a distance from a joining edge between the plate and the upright, each contactor block comprises a protuberance, which cooperates with the groove in an engaged configuration of the corresponding contactor block, in which this contactor block is movable in rotation with respect to the support about the axis of the groove, this contactor block being in the joined position when this contactor block is both in the engaged configuration and abutting against the fixed support, and each secondary line of this contactor block is connected to the corresponding intermediate terminal when this contactor block is in the engaged configuration and comes into abutment against the fixed support;

the control block comprises a blocking member, which is movable by an operator between a blocked position, in which the blocking member cooperates with the rest of the electrical device in such a way that the control block is not movable by an operator between the joined position and the disjoined position of the control block, and an unlocked position, in which the control block is movable by an operator between the joined and disjoined positions of this control block;

the fixed support incorporates a measurement device, which is configured to measure a current flowing through each of the supply lines and to transmit, to the monitoring device, information relating to the values of the current measurements;

the measurement device comprises a connection interface, made in an upper portion of the support, and the control block comprises an interface complementary to the connection interface, the connection interface and the complementary interface being connected to one another when the control block is in the joined position;

the control block comprises guide members that cooperate with complementary members made on the rest of the electrical device so as to guide the control block when joining to the rest of the electrical device in a translational movement, and the connection between the connection interface and the complementary interface is made together with the translational movement of the control block when joining it to the rest of the device;

the electrical device comprises four contactor blocks, and the control block comprises a communication interface connected to the electronic monitoring device, which interface is configured to allow an operator to send commands to the electronic monitoring device and to receive information from the electronic monitoring device.

BRIEF DESCRIPTION OF THE DRAWINGS

The invention will be better understood and other advantages thereof will become more clearly apparent in light of the following description of one embodiment of an electrical device according to the principle thereof, provided solely by way of example and given with reference to the appended drawings, in which.

DETAILED DESCRIPTION

Figure 1:
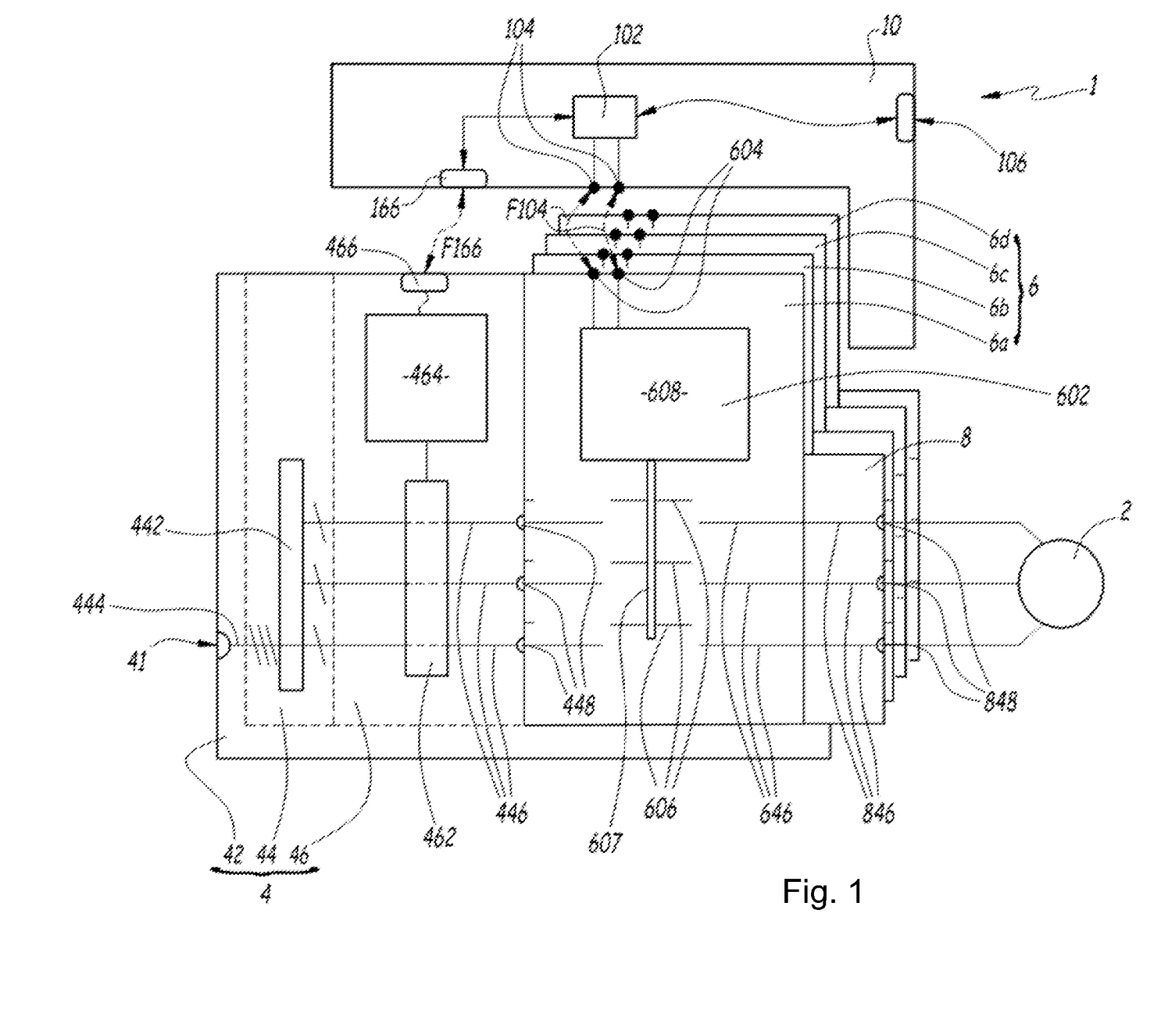
FIG. 1 is an overview of an electrical device according to the invention.
Figure 2:
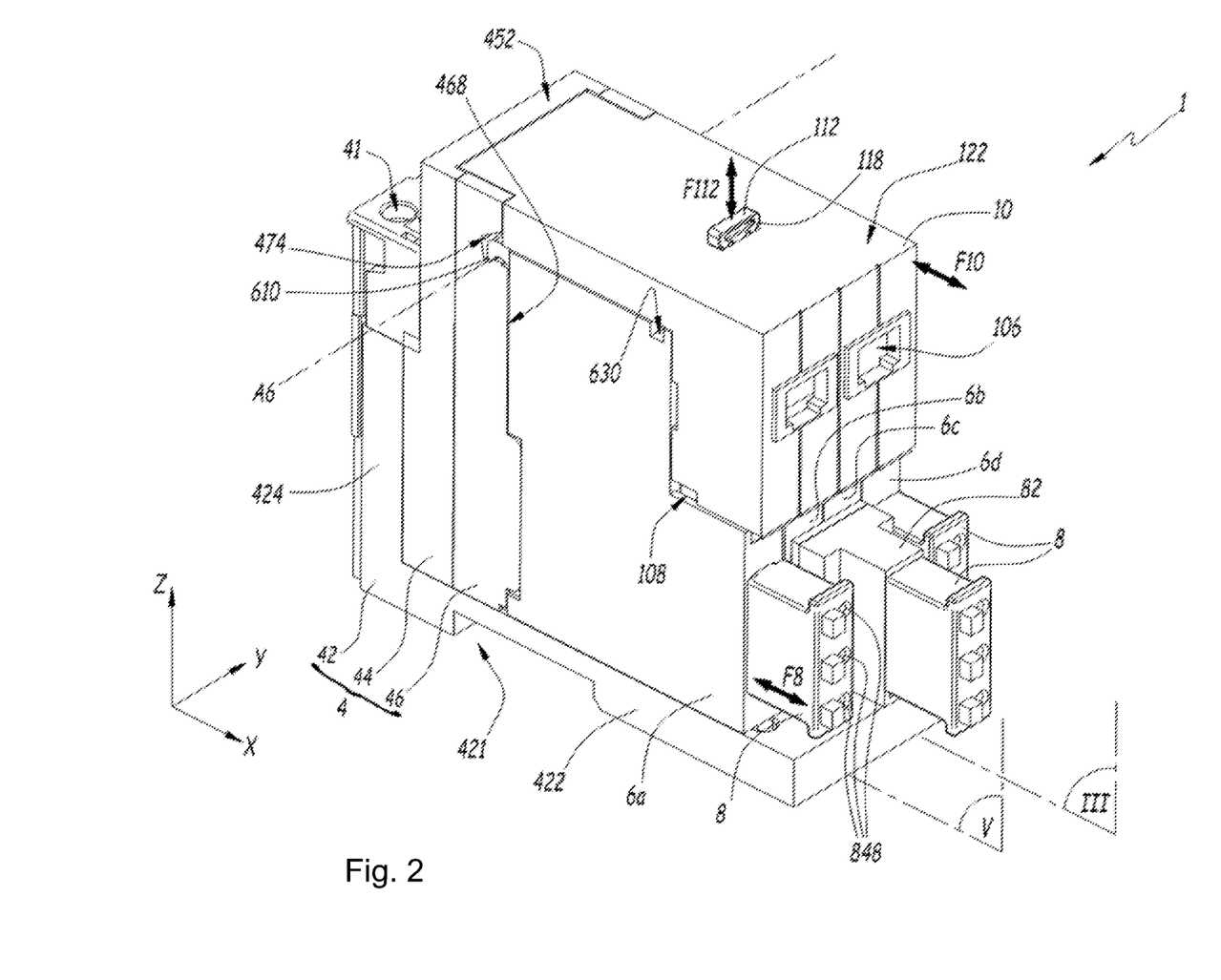
FIG. 2 is a perspective view of the device of FIG. 1, shown in a joined configuration.

An electrical device 1 is shown in FIGS. 1 and 2. The electrical device 1 is configured to control the supply of power to power electrical units such as electric motors. A single electric motor 2 is shown only in FIG. 1. The electric motor 2 shown in FIG. 1 does not form part of the invention and serves only to specify the context thereof.

The device 1 comprises here one power supply input and a plurality of power supply outputs, between which an electric supply current received over the power supply input is redistributed. The power supply outputs are configured for each of them to be connected to a power unit and to control this power unit, by allowing the selective switching of the power supply to this power unit. In some cases, two power supply outputs are connected to one and the same power unit, as explained below in the present description.

For example, the device 1 is used within a motor starter assembly to control the supply of power to a plurality of AC electric motors.

The device 1 comprises a fixed support 4, to which the contactor blocks 6, here four in number and denoted individually by 6*a*, 6*b*, 6*c* and 6*d*, are joined.

Advantageously, the contactor blocks 6*a* to 6*d* operate in the same way, or are even identical to one another. The contactor blocks 6*a* to 6*d* are thus interchangeable, which facilitates the replacement of a contactor block 6 during a maintenance operation and allows costs to be decreased through standardization.

Each of the contactor blocks 6 has an output terminal block, not shown, which is connected, as the case may be, to a respective connector 8 or to an intermediate connector 82. In FIG. 2, the contactor blocks 6*a* and 6*d* are each connected to a connector 8, while the contactor blocks 6*b* and 6*c*, which are adjacent, are connected to one and the same intermediate connector 82, this intermediate connector 82 being itself connected to a connector 8.

The connectors 8 or 82 are connected to the corresponding contactor blocks 6 via a translational movement of the connector 8 or 82 with respect to the contactor block 6, this translational movement being represented by a double-headed arrow F8 in the figures.

Each of the connectors 8 is configured to be electrically connected to a power electrical unit. In FIG. 1, the power unit 2 is connected to the connector 8 of the contactor block 6*a*, while the other connectors 8 are not connected to a power unit.

Each connector 8 is advantageously asymmetric in shape, comprising for example a keying ear, not shown, such that each connector 8 may be connected to a contactor block 6 or to an intermediate connector 82 only in one way, thus making it possible to retain, after each disconnection/reconnection cycle, a matchup between the phases of the power unit and the phases of the secondary lines 646, which constitutes the "wiring memory".

The electrical device 1 also comprises a control block 10. In FIG. 1, the control block 10 is shown disjoined from the rest of the device 1 in order to better explain the interfaces between the control block 10 and the rest of the device 1, as described below. In FIG. 2, the control block 10 is shown joined to the rest of the device 1, in a joined configuration of the electrical device 1.

The device 1 further comprises input terminals 41 for receiving a polyphase electric current, such as a three-phase current for supplying the electric motors with power. The input terminals 41 are for example connected to a power source external to the device 1. For example, for a three-phase electric current, the input terminals 41 are formed by three distinct electrical conductors, each associated with one phase of the electric current. The input terminals 41 are here arranged at least partially inside the fixed support 4.

The fixed support 4 further comprises a base 42, a distribution module 44 and a protection module 46. In the example illustrated, the fixed support 4 is intended to be installed within an electrical switchboard, the base 42 comprising various mechanical attachment members, such as a recess 421 that is configured to cooperate for example with a rail of an electrical switchboard, the rail and the switchboard not being shown.

The distribution module 44 comprises a distribution circuit 442, which is, on the one hand, connected to the input terminals 41 via a first power line 444 and, on the other hand, connected to supply lines 446. The distribution circuit 442 is thus configured to distribute the polyphase current from the power line 444 to each of the single-phase supply lines 446. In this example, the power line 444 comprises three phases, each phase being carried by a supply line 446, which are therefore three in number. The supply lines 446 are each suitable for carrying an electric supply current from the distribution circuit 442 to a corresponding electrical unit downstream of the device 1. Each of the contactor blocks 6a to 6d is thus connected to the supply lines 446 by means of intermediate terminals 448, which are fixed and form part of the support 4. The intermediate terminals 448 comprise for example a plurality of distinct electrical conductors, here three in number, each associated with one phase of the electric current carried by the power line 444.

The protection module 46 comprises a measurement device 462, which is here configured to measure an electric current flowing within each of the supply lines 446. The measurement device 462 is connected to a monitor 464, which is configured to receive the measurements from the measurement device 462, the monitor 464 being itself connected to an interface 466 that is accessible from the exterior of the support 4. The monitor 464 is for example configured to generate an alert signal when the current measured in one of the supply lines 446 by means of the measurement device 462 is greater than a predetermined value, indicating for example a malfunction in one of the power units connected downstream of the electrical device 1.

In the example illustrated, the base 42, the distribution module 44 and the protection module 46 are modules that are joined to one another during the manufacturing of the support 4, and are not intended to be disassembled by an operator. As a variant, the base 42 and the distribution and protection modules 44 and 46 may be disassembled. According to another variant, the base 42 and the modules 44 and 46 are incorporated within one and the same housing.

Each of the contactor blocks 6a to 6d comprises a plurality of secondary lines 646, which are each connected to a respective supply line 446 at the intermediate terminals 448. In the example illustrated, each contactor block 6a to 6d thus comprises three secondary lines, each corresponding to one of the phases of the power line 444 which is here three-phase.

Each contactor 8 comprises terminal lines 846, each connected to a respective secondary line 646 of the contactor block 6a to 6d on which the connector 8 is mounted. In this example, each of the connectors 8 thus comprises three terminal lines 846, corresponding to one of the phases of the current carried by the power line 444, which is here three-phase.

Each of the terminal lines 846 is accessible from the exterior of the corresponding connector 8 via an output terminal 848. In the example illustrated, the motor 2 is thus connected to the three output terminals 848 of the connector 8 that is joined to the contactor block 6a.

Each contactor block 6a to 6d further comprises a switching device 602, which is switchable between an open position, in which all of the secondary lines 646 of this contactor block 6a to 6d are open and prevent a current from flowing through the secondary lines 646 of this block, and a closed position, in which all of the secondary lines 646 of this contactor block 6a to 6d do not prevent the flow of the current.

The switching device 602 of each contactor block 6a to 6d is configured to be controlled via a control interface 604, which is accessible from the exterior of the contactor blocks 6a to 6d in the position joined to the support 4.

In the example illustrated, each switching device 602 comprises movable contacts 606, each movable contact 606 being associated with a respective secondary line 646. The movable contacts 606 of one and the same contactor block 6 are rigidly connected to a stem 607, which is moved by means of an electromagnetic device comprising a coil 608, which is connected to the control interface 604. Each switching device 602 comprises an elastic member, for example a spring, not shown, which pushes the coil 608 back into a "rest" position, in which the movable contacts 606 are not connected to the respective secondary lines 646 and in which the switching device 602 is in the open position.

Thus, when no voltage is applied at the control interface 604, in particular when the control interface 604 is not connected to any other unit, the coil 608 is in the rest position and the switching device 602 is in the open position.

More generally, the switching device 602 is controllable from the control interface 604.

The control block 10 comprises an electronic monitoring device 102, which is connected to an interface 104, accessible from the exterior of the control block 10.

According to some embodiments, the electronic monitoring device 102 comprises a computer logic unit (CPU), such as a programmable microcontroller, a microprocessor or the like, and a computer memory forming a storage medium for computer-readable data.

According to some examples, the memory is a ROM memory, a RAM memory, or an EEPROM or flash non-volatile memory or the like. The memory comprises executable instructions and/or computer code for ensuring the operation of the monitoring device 102 in accordance with one or more of the embodiments described below when executed by the computer logic unit.

In the joined configuration of the electrical device 1, the interface 104 of the control block 10 is connected to each of the control interfaces 604 of the contactor blocks 6. The cooperation between the control interface 604 and the interface 104 of the control block 10 is represented by two double-headed dashed arrows F104. The electronic monitoring device 102 is connected to the switching device 602 of each of the contactor blocks 6a to 6d and is configured to control the switching of each switching device 602 independently of the other switching devices 602. In other words, in the joined position, the control block 10 cooperates electrically with the rest of the electrical device 1.

When the control block 10 is in the disjoined position, the switching device 602 of each contactor block 6a to 6d is in the open state, i.e. no electric current can flow within the secondary lines 646. The contactor blocks 6a to 6d may thus be disjoined from the fixed support 4 in complete safety.

The control block 10 also comprises a monitoring interface 166, which is connected to the electronic monitoring device 102 and which cooperates, in the joined configuration of the electrical device 1, with the interface 466 of the monitor 464. The cooperation between the monitoring interface 166 and the interface 466 is represented by a double-headed dashed arrow F166. The monitoring device 102 is thus configured to exchange information with the monitor 464, in particular information on measurement values of the current flowing through each of the supply lines 446.

The control block 10 further comprises a communication interface 106, which is connected to the electronic monitoring device 102 and which is configured to allow the exchange of information between an operator and the monitoring device 102. In the example illustrated, the communication interface 106 is an RJ45-format connecting connector, accessible from the exterior of the control block 10 when the electrical device 1 is in the joined configuration. Optionally, the communication interface 106 incorporates wireless communication means, or else a visual interface, which is visible to an operator and presents information on an operating state of the electrical device 1 to this operator.

In FIG. 2, the two contactor blocks 6b and 6c, which are adjacent, are connected to one and the same intermediate connector 82, also called a "reversing" connector, which is itself connected to a single connector 8. The secondary lines 646 of the contactor blocks 6b or 6c are thus connected to the output terminals 848 of the connector 8 that is connected to the intermediate connectors 82 depending on the open or closed state of the switching devices 602 of the contactor blocks 6b or 6c. An intermediate connector 82 of reversing type is for example used to control the starting and stopping of an electric motor according to a known principle.

In the example illustrated in FIGS. 2 to 6, the base 42 of the support 4 is L-shaped, with a plate 422 and an upright 424. The plate 422 is rectangular in shape, and extends along a plane assumed to be horizontal in the figures. The upright 424 is in the shape of an elongate parallelepiped arranged vertically, i.e. perpendicular to the plate 422. In the present description, the concepts of up, down, above, below, front, rear, etc. are defined in relation to the orientation of the electrical device 1 in the figures, without presupposing any orientation of use of the electrical device 1 in practice.

For convenience, an orthonormal coordinate system X, Y and Z is defined such that the axis Z is oriented perpendicular to the plate 422, the axis X is oriented perpendicular to the upright 424, the axis Y being parallel to a joining edge between the plate 422 and the upright 424. The plate 422 thus has an upper face 426, oriented upwards, i.e. orthogonal to the direction of the axis Z.

In the example illustrated, the distribution 44 and protection 46 modules are each substantially in the shape of an elongate parallelepiped, and each extend lengthwise parallel to the upright 424, the upright 424, the distribution module 44 and the protection module 46 being affixed to one another.

The intermediate terminals 448 are made on a bottom portion of a front face 468 of the protection module 46, while the interface 466 is located on an upper face 470 of the protection module 46. The front face 468 is orthogonal to the direction of the axis X, while the upper face 470 is orthogonal to the direction of the axis Z.

Figure 6:
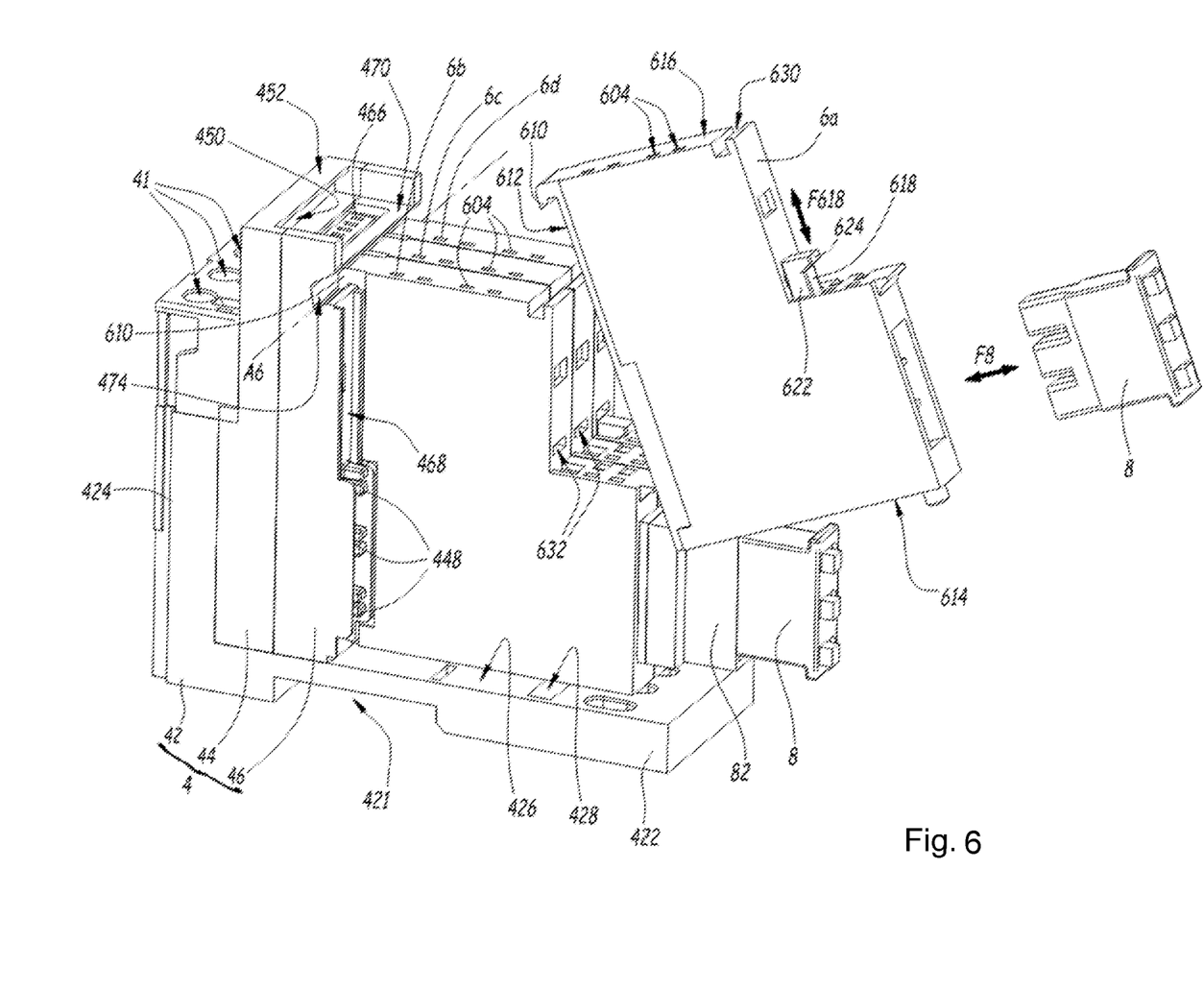
FIG. 6 is a perspective view of the electrical device of FIG. 2, shown in another disjoined configuration, some elements being omitted for ease of reading.

Guides 472, visible in FIG. 6, are made on either side of the intermediate terminals 448 so as to guide the contactor blocks 6a to 6d when they are being joined to the support 4, as described below.

A recess 450 is made in an upper face 452 of the distribution module 44, the recess 450 opening out in the forward direction, i.e. in the direction of the axis X, onto the connection interface 466. The connection interface 466 is configured so as to be connected to a complementary interface via a translational movement parallel to the axis X.

A groove 474 is made in the front face 468 in proximity to the joining edge between the front face 468 and the upper face 470 parallel to the direction of the axis Y. The groove 474 cooperates with a protuberance 610 made on each of the contactor blocks 6a to 6d, so that, in the joined position of each contactor block 6a to 6d, a rear face 612 of this contactor block 6a to 6d cooperates mechanically with the front face 468 of the protection module 46, while a lower face 614 of this contactor block 6a to 6d butts against the upper surface 426 of the plate 422.

Figure 3:
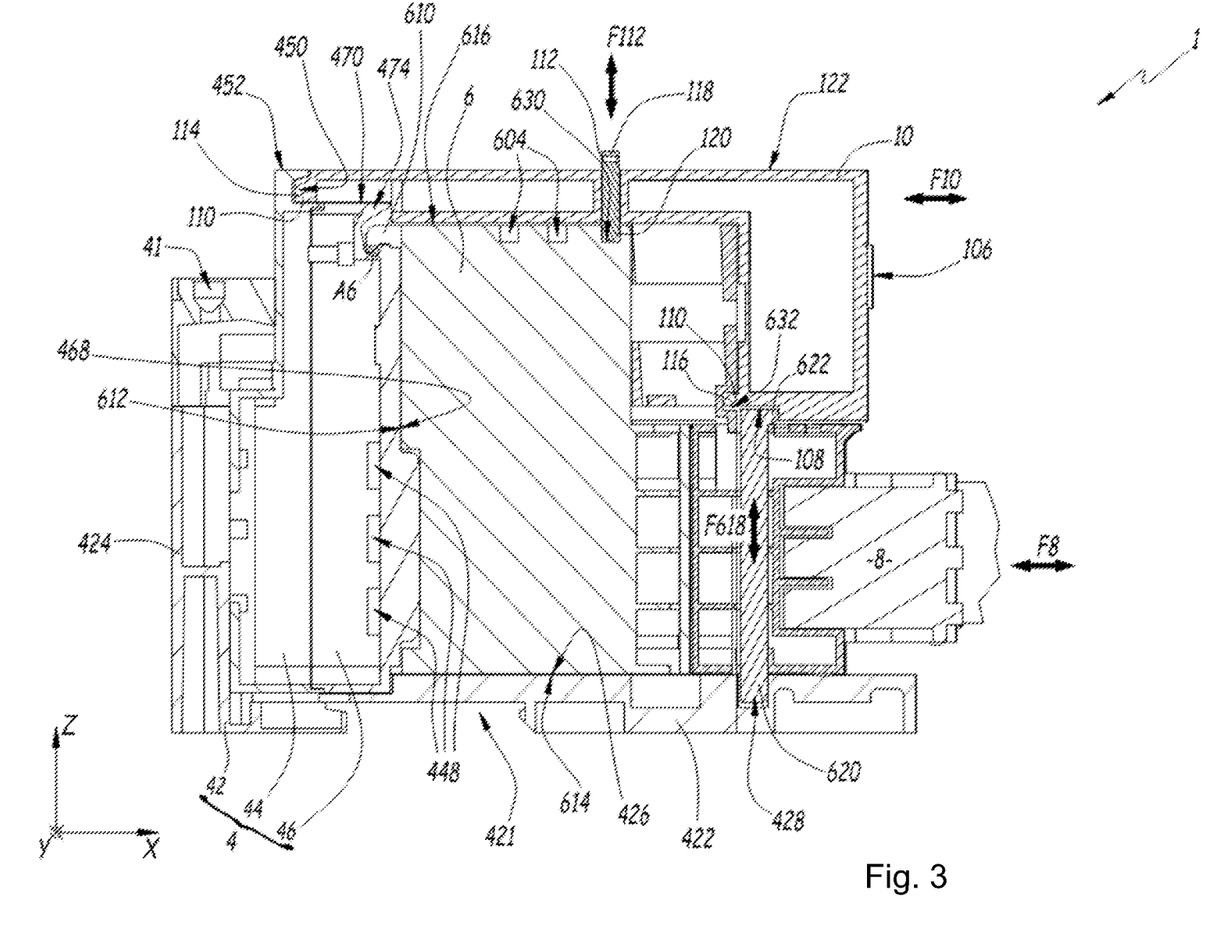
FIG. 3 is a cross section of the electrical device of FIGS. 1 and 2, along a plane III in FIG. 2.
Figure 4:
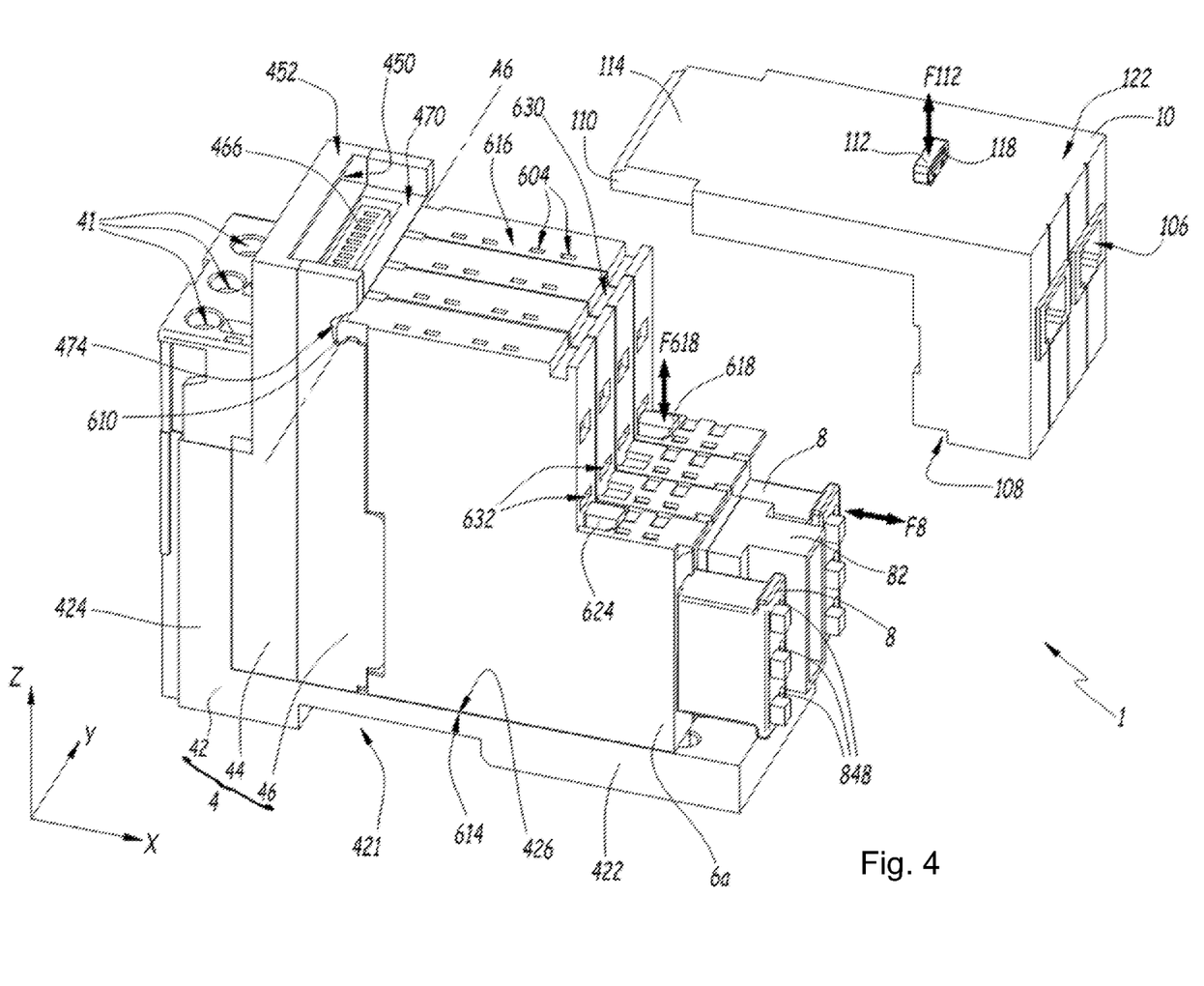
FIG. 4 is a view analogous to FIG. 2, some elements of the electrical device being in a disjoined position.
Figure 5:
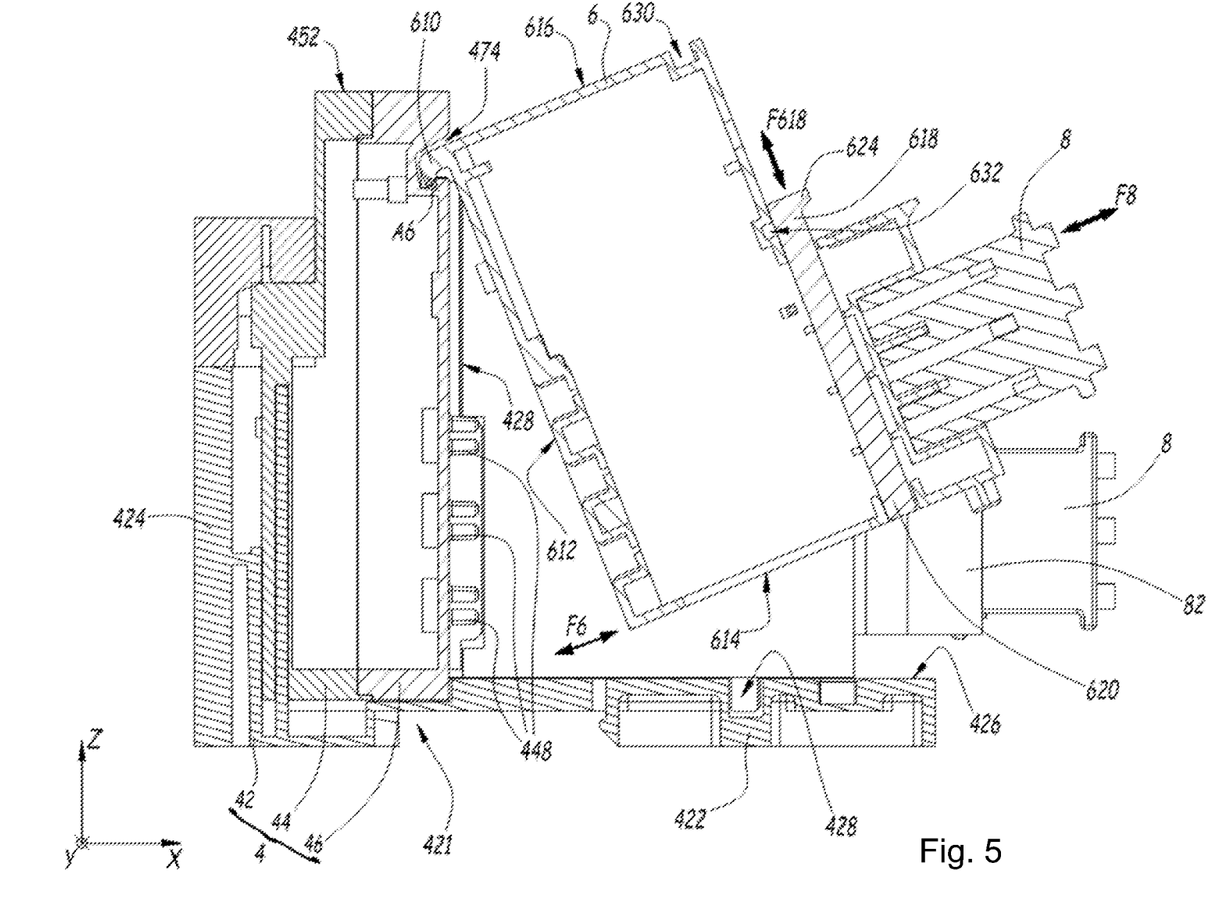
FIG. 5 is a cross section of the electrical device of FIG. 1 along a plane V in FIG. 2, the electrical device being shown in another disjoined configuration, some elements being omitted for ease of reading.

In the example illustrated, the protuberance 610 is in the shape of a hook oriented downwards in the joined position, while the groove 474 has a complementary shape, which is configured so that, when the protuberance 610 of one of the contactor blocks 6a to 6d cooperates with the groove 474 in an "engaged" configuration, such as shown in FIGS. 2 to 5, the movement of this contactor block 6a or 6d with respect to the fixed support 4 is a rotational movement, about an axis A6 parallel to the direction of the axis Y and passing in the vicinity of the location of contact between the protuberance 610 and the groove 474. The rotational movement of the contactor block 6a to 6d on the fixed support 4 is represented in FIG. 5 by a double-headed arrow F6, which is a portion of a circular arc centred on the axis A6. By extension, it is said that one of the contactor blocks 6a to 6d is in the engaged configuration when the protuberance 610 of this contactor block cooperates with the groove 474 and the movement of this contactor with respect to the fixed support 4 is a rotational movement following the arrow F6, while the joined position of this contactor 6a to 6d corresponds to the situation in which, on the one hand, this contactor 6a to 6d is in the engaged configuration and in which, on the other hand, the rear face 612 butts against the front face 468 of the support 4 and the lower face 614 butts against the upper face 426 of the plate 422.

Each contactor block 6a to 6d comprises a locking member 616, which makes it possible to block the rotational movement following the arrow F6 of each contactor block 6a to 6d with respect to the support 4 about the axis A6 when this contactor block 6a to 6d is in the joined position.

The locking member 616 of each contactor block 6a to 6d is movable by an operator between a locked position, in which this contactor block 6a to 6d is held in the joined position, and an unlocked position, in which this contactor block 6a to 6d is movable between its joined position, as shown in FIG. 4, and an intermediate position shown in FIG. 5, in which the contactor block 6a is in the engaged position without being connected to the intermediate terminals 448.

In the example illustrated, the locking member 616 of each contactor block 6a to 6d is a stem 618, which comprises a bottom end 620 and a top end 622 which is opposite the bottom end 620 and which comprises a head 624 for gripping by a user. Each stem 618 is movable in translation with respect to the rest of this contactor block 6a to 6d parallel to a longitudinal axis of this stem, the translational movement of the stems 618 being represented by a straight double-headed arrow F618. In the example illustrated, the stem 618 of each contactor block 6a to 6d is vertical when the corresponding contactor block 6a to 6d is in the joined position.

In the locked position of the locking member 616, the bottom end 620 protrudes from the lower face 614 of the corresponding contactor block 6. When the corresponding contactor block 6 is in the joined position, the bottom end 620 cooperates with a recess 428 made in the upper face 426 of the plate 422. The stem 618 is then in a down position, as illustrated in FIG. 3, and prevents the rotational movement of the corresponding contactor block 6 following the arrow F6.

When the control block 10 is in the joined position, the head 624 of each stem 618 is accommodated in the recess 108 of the control block 10, in such a way that the translational movements of each stem 618 following the arrow F618 are prevented. Thus, the locking member 616 of each contactor block 6 in the joined position is held in the locked position by the control block 10, which constitutes an example of mechanical cooperation of the control block with the rest of the device 1.

When the control block 10 is in the disjoined position, the head 624 of each stem 618 is accessible to an operator, who may thus move the one or more stems 618 as they desire between the locked position and the unlocked position of these one or more stems, so as to free the one or more corresponding contactor blocks 6 to move in rotation following the arrow F6, independently of the other contactor blocks 6. In the example illustrated, the control block 10 in the disjoined position allows an operator to manipulate the head 624 of a stem 618 of one of the contactor blocks 6a to 6d, the operator thus being able to move the stem 618 from its down position to its up position, in which the bottom end 620 of the stem 618 does not prevent the rotational movement of the corresponding contactor block 6a to 6d about the axis A6.

Furthermore, when the locking member 616 of one of the contactor blocks 6a to 6d is in the unlocked position, this locking member 616 prevents the control block 10 from being joined to the rest of the electrical device 1, as described below.

Optionally, when the locking member 616 of one of the contactor blocks 6 is in the locked position, the contactor 8 or 82 that is connected to this contactor block 6 cannot be removed, which makes it possible to prevent unwanted pulling out of the connector 8 or 82 when the corresponding contactor block 6 is in the joined position.

The control block 10 further comprises guide members 110 and a blocking member 112. The guide members 110, which included here a nose 114 that is configured to cooperate with the recess 450 of the fixed support 4 and ears 116 that cooperate with hollows 630 made in each of the contactor blocks 6a to 6d, are configured so that the movement of the control block 10 with respect to the rest of the electrical device 1 when joining the control block 10 is a translational movement. In the example illustrated, the guide members 110 are configured to guide the control block 10 in translation with respect to the rest of the device 1 parallel to the direction of the axis X, this translational movement being represented by the double-headed arrow F10.

The blocking member 112 is movable by an operator between a blocked position, in which the blocking member 112 cooperates with the rest of the electrical device 1 in such a way that the translational movement of the control block 10 is prevented, and a deblocked position, in which the blocking member 112 does not prevent the translational movement of the control block 10 with respect to the rest of the device 1. In other words, the blocking member 112 cooperates with the rest of the electrical device 1 in such a way that the control block 10 is not movable by an operator between the joined position and the disjoined position of the control block 10.

In the example illustrated, the blocking member 112 is a stop made in the control block 10, the blocking member 112 being movable in translation with respect to the control block 10 in a direction parallel to the axis Z when the control block 10 is in the joined position. The translational movement of the blocking member 112 with respect to the control block 10 is represented by a double-headed arrow F112 in the figures.

The blocking member 112 comprises an upper end 118, which is intended to be manipulated by an operator and which protrudes from an upper face 122 of the control block 10, and a lower end 120, which cooperates with a groove 630 made in the upper face 616 of each of the contactor blocks 6a to 6d, facing the lower end 120 when the electrical device 1 is in the joined configuration. The cooperation of the blocking member 112 of the control block 10 with the grooves 630 of the contactor blocks 6 is an example of mechanical cooperation of the control block 10 with the rest of the electrical device 1 in the joined position of the control block.

Advantageously, the control block 10 comprises a position sensor, not shown, configured to determine whether the blocking member 112 is in the blocked or deblocked position and to transmit this information to the electronic monitoring device 102. Thus, in the joined configuration of the device 1, when a user places the blocking member 112 in the deblocked position, the monitoring device 102 is configured to switch each switching device 602 to its open position. Optionally, the control block 10 comprises an indicator, for example a light-emitting diode, which visually informs the user of the blocked or deblocked position of the blocking member 112.

In normal operation, the device 1 is in the joined configuration, as shown in FIGS. 2 and 3. When a user wishes to replace one of the contactor blocks 6a to 6d, for example the block 6a, in a first step, the operator orders the electronic monitoring device 102, via the communication interface 106, to switch the switching devices 602 of each contactor block 6 to the open position, before deblocking the blocking member 112 and disjoining the control block 10 by translation following the arrow F10.

Alternatively, if the communication interface 106 is not available, or else in the event of an emergency, the operator manually moves the blocking member 112 to the unlocked position, the electronic monitoring device 102 then switching each switching device 602 to the open position. The operator may then disjoin the control block 10 by translation following the arrow F10 in complete safety.

In the event that the electronic monitoring device 102 is malfunctioning and does not control the switching devices 602 as expected when the blocking member 112 is manipulated, the operator disjoining the control block 10 from the rest of the device 1 electrically disconnects the interface 104 of the control block 10 from the control interface 604 of each contactor block 6. The coil 608 of each switching device 602 then returns to the rest position, and each switching device 602 is then in the open position.

By virtue of the mechanical and electrical cooperation of the control block 10 with the rest of the electrical device 1, the operator thus benefits from multiple levels of safety during maintenance operations on the electrical device 1, to guarantee that the switching device 602 of each contactor block 6 is in the open position when the control block 10 is in the disjoined position. The device 1 then returns to the configuration shown in FIG. 4.

Next, the operator unlocks, by translation following the arrow F618, the locking member 616 of the contactor block 6a to 6d of their choice, so as to free this contactor block to move in rotation about the axis A6. The operator then moves the contactor block 6a to 6d thus unlocked by rotating about the axis A6, until reaching the intermediate position shown in FIG. 5. In the rotational movement of the contactor block 6, the secondary lines 646 are disconnected from the corresponding intermediate terminals 448.

The operator may then remove the contactor block 6a to 6d from the rest of the electrical device 1, disengaging the protuberance 610 from the groove 474. The contactor block 6 is then in the disjoined position. The operator then disconnects the connector 8 from the contactor block 6 in the disjoined position by translating the connector 8 following the arrow F8.

If this connector 8 is connected to a power unit, such as the motor 2, there is no need for the operator to disconnect the power unit from the connector 8. Once the contactor block 6 has been replaced, the operator just has to reconnect the connector 8 to the new contactor block 6, which allows the wiring memory to be retained.

Alternatively, once the unlocking member 616 has been placed in the unlocked position, the operator may disconnect the connector 8 by translating following the arrow F8 before rotating the corresponding contactor block 6 about the axis A6.

Once the connector 8 has been reconnected to the new contactor block 6, the operator engages the protuberance 610 into the groove 474, the contactor block 6 then being in the engaged configuration. Then, by rotating the contactor block 6 about the axis A6, the operator brings the contactor block 6 into abutment against the fixed support 4, the contactor block 6 then being in the joined position. The secondary lines 646 of the contactor block 6 are then reconnected to the intermediate terminals 448 of the fixed support 4.

The operator then locks the contactor block 6 into the joined position by moving the locking member 616 of this contactor block 6 from its unlocked position to its locked position, i.e. here by translating the stem 618 following the arrow F618.

When the locking members 616 of all of the contactor blocks 6 in the joined position are placed in the unlocked position, the operator joins the control block 10 to the rest of the device 1 by translating following the arrow F10, the nose 114 of the control block 10 cooperating with the recess 450 of the support, while the ears 116 each cooperate with a respective recess 108 made in each contactor block.

When the control block 10 is in the joined position, the operator blocks the translational movement of the control block 10 by moving the blocking member 112 from its deblocked position to its blocked position.

The electrical device 10 is then ready to receive instructions from the operator, for example via the communication interface 106.

In the example illustrated, the electrical device 1 has a length, measured parallel to the axis Y, equal to 45 mm, and comprises four contactor blocks 6. The size of each contactor block is suited to an industrial environment and suited to the electrical powers flowing through the secondary lines 646, the electrical device being for example sized for a three-phase current at a voltage of up to 500 volts.

Of course, the shape of the device 1 is not limiting, and the device 1 may have other dimensions and a different number of contactor blocks 6.

The embodiments and the variants mentioned above may be combined with one another so as to create new embodiments of the invention.

The invention claimed is:

1. An electrical device for supplying power to a plurality of power units, comprising a fixed support and a plurality of contactor blocks, in which:

the fixed support comprises input terminals, for receiving a polyphase power current, and a distribution circuit that is configured to distribute the power current to power lines that each comprise a plurality of single-phase supply lines, the fixed support comprising a number of power lines that is the same as the number of contactor blocks of the electrical device, and each power line comprising a number of supply lines that is the same as the number of phases of the power current, each of the supply lines of a contactor block being connected to a respective phase of the power current, the supply lines being accessible on the outside of the fixed support via intermediate terminals, each contactor block comprises secondary lines, each secondary line being connected to a respective supply line via a respective intermediate terminal, the contactor blocks being movable between a joined position, in which each secondary line is electrically connected to a specific primary line via an intermediate terminal and is accessible on the outside of the contactor block via an output terminal block, and a disjoined position, in which each secondary line is not connected to a primary line, each contactor block further comprising a switching device, which is switchable between an open position, in which all of the secondary lines of this contactor block are open, and a closed position, in which all of the secondary lines of this contactor block are closed and do not prevent the current from flowing between the intermediate terminals and the output terminal block, wherein the electrical device also comprises a control block, which is movable between a joined position, in which the control block cooperates mechanically and electrically with the rest of the electrical device, and a disjoined position, in which the control block does not cooperate, either mechanically or electrically, with the rest of the electrical device, wherein when the control block is in the joined position, each contactor block is, on the one hand, held in the joined position, an electronic monitoring device of the control block also being connected to the switching device of each of the contactor blocks, the electronic monitoring device being configured to control the switching of each switching device independently of the other switching devices, wherein when the control block is in the disjoined position, the switching device of each of the contactor blocks is in the open state, while each of the contactor blocks is movable between its joined position and its disjoined position, independently of the other contactor blocks, and wherein the electrical connection between the secondary lines and the power units is provided by connectors, each connector being able to be disconnected from the one or more corresponding output terminal blocks when the one or more corresponding contactor blocks are in the disjoined position.

2. The electrical device according to claim 1, wherein each contactor block comprises a locking member, which is movable by an operator between a locked position, in which this contactor block is held in the joined position, and an unlocked position, in which this contactor block is movable between its joined position and its disjoined position,
wherein when the control block is in the joined position, the locking member of each contactor block in the joined position is held in the locked position,
and wherein when the control block is in the disjoined position, the locking member of each contactor block is accessible to an operator and is movable between the locked position and the unlocked position.

3. The electrical device according to claim 2, wherein the locking member comprises a stem with a first end and an opposite, second end, the stem being movable in translation with respect to the corresponding contactor block, wherein the first end of the locking member in the locked position extends beyond a lower face of the corresponding contactor block,
and wherein the joined position of the contactor block, the first end of the locking member in the locked position cooperates with a complementary recess made in the fixed support so as to prevent the contactor block from moving, while the second end is blocked in translation by the control block in the joined position.

4. The electrical device according to claim 1, wherein the support comprises a plate and an upright orthogonal to the plate along an edge defining a transverse direction of the support,
wherein a groove opening out onto a front face of the upright is made in the upright in a direction parallel to and at a distance from a joining edge between the plate and the upright,
wherein each contactor block comprises a protuberance, which cooperates with the groove in an engaged configuration of the corresponding contactor block, in which this contactor block is movable in rotation with respect to the support about the axis (A6) of the groove, this contactor block being in the joined position when this contactor block is both in the engaged configuration and abutting against the fixed support,
and wherein each secondary line of this contactor block is connected to the corresponding intermediate terminal when this contactor block is in the engaged configuration and comes into abutment against the fixed support.

5. The electrical device according to claim 1, wherein the control block comprises a blocking member, which is movable by an operator between a blocked position, in which the blocking member cooperates with the rest of the electrical device in such a way that the control block is not movable by an operator between the joined position and the disjoined position of the control block, and an unlocked position, in which the control block is movable by an operator between the joined and disjoined positions of this control block.

6. The electrical device according to claim 1, wherein the fixed support incorporates a measurement device, which is configured to measure a current flowing through each of the supply lines and to transmit, to the monitoring device, information relating to the values of the current measurements.

7. The electrical device according to claim 6, wherein the measurement device comprises a connection interface, made in an upper portion of the support, and wherein the control block comprises an interface complementary to the connection interface, the connection interface and the complementary interface being connected to one another when the control block is in the joined position.

8. The electrical device according to claim 7, wherein the control block comprises guide members that cooperate with complementary members made on the rest of the electrical device so as to guide the control block when joining to the rest of the electrical device in a translational movement, and wherein the connection between the connection interface and the complementary interface is made together with the translational movement of the control block when joining it to the rest of the device.

9. The electrical device according to claim 1, wherein the electrical device comprises four contactor blocks.

10. The electrical device according to claim 1, wherein the control block comprises a communication interface connected to the electronic monitoring device, which interface is configured to allow an operator to send commands to the electronic monitoring device and to receive information from the electronic monitoring device.

* * * * *